US012165661B2

(12) United States Patent
Laitinen et al.

(10) Patent No.: US 12,165,661 B2
(45) Date of Patent: Dec. 10, 2024

(54) DETERMINATION OF THE SIGNIFICANCE OF SPATIAL AUDIO PARAMETERS AND ASSOCIATED ENCODING

(71) Applicant: Nokia Technologies Oy, Espoo (FI)

(72) Inventors: Mikko-Ville Laitinen, Espoo (FI); Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/441,829

(22) PCT Filed: Mar. 26, 2020

(86) PCT No.: PCT/FI2020/050194
§ 371 (c)(1),
(2) Date: Sep. 22, 2021

(87) PCT Pub. No.: WO2020/193865
PCT Pub. Date: Oct. 1, 2020

(65) Prior Publication Data

US 2022/0189494 A1 Jun. 16, 2022

(30) Foreign Application Priority Data

Mar. 28, 2019 (GB) ..................................... 1904303

(51) Int. Cl.
*G10L 19/02* (2013.01)
*G10L 25/21* (2013.01)

(52) U.S. Cl.
CPC .............. *G10L 19/02* (2013.01); *G10L 25/21* (2013.01)

(58) Field of Classification Search
CPC ....... G10L 19/02; G10L 25/21; G10L 19/008; G10L 25/51; G10L 25/06; H04S 7/30;
(Continued)

(56) References Cited

U.S. PATENT DOCUMENTS

2006/0233379 A1 10/2006 Villemoes et al.
2007/0016416 A1 1/2007 Roden et al.
(Continued)

FOREIGN PATENT DOCUMENTS

CN 1860526 A 11/2006
CN 101499279 A 8/2009
(Continued)

OTHER PUBLICATIONS

Herre, Jürgen, et al. "MPEG surround—the ISO/MPEG standard for efficient and compatible multichannel audio coding." Journal of the Audio Engineering Society 56.11 (2008), pp. 932-955. (Year: 2008).*
(Continued)

*Primary Examiner* — Jesse S Pullias
*Assistant Examiner* — Michael C. Lee
(74) *Attorney, Agent, or Firm* — ALSTON & BIRD LLP

(57) ABSTRACT

There is inter alia disclosed an apparatus for spatial audio encoding which can receive or determine for one or more audio signals (102), spatial audio parameters (106) on a sub band basis for providing spatial audio reproduction, the spatial audio parameters can comprise a coherence value (112) for each sub band of a plurality of subbands (202) of a frame. The apparatus then determines a significance measure for the coherence values (401) of the plurality of sub bands of the frame and uses the significance measure to determine whether to encode (403) the coherence values of the plurality of sub bands of the frame.

18 Claims, 7 Drawing Sheets

(58) Field of Classification Search
CPC .. H04S 2420/03; H04S 3/008; H04S 2420/11; H04S 3/00; H04S 7/00; G06F 16/683
See application file for complete search history.

(56) References Cited

U.S. PATENT DOCUMENTS

| | | | | |
|---|---|---|---|---|
| 2007/0036360 | A1 | 2/2007 | Breebaart | |
| 2007/0219808 | A1* | 9/2007 | Herre | H04S 3/008 704/500 |
| 2009/0222272 | A1* | 9/2009 | Seefeldt | G10L 19/008 704/E21.001 |
| 2012/0224702 | A1 | 9/2012 | Den Brinker et al. | |
| 2013/0170748 | A1 | 7/2013 | Thyagarajan | |
| 2014/0052439 | A1* | 2/2014 | Rose | G10L 19/09 704/219 |
| 2014/0112482 | A1* | 4/2014 | Virette | G10L 19/008 381/23 |
| 2014/0229171 | A1* | 8/2014 | Atti | G10L 19/24 704/225 |
| 2014/0233762 | A1* | 8/2014 | Vilkamo | G10H 1/183 381/119 |
| 2015/0332680 | A1 | 11/2015 | Crockett et al. | |
| 2016/0005413 | A1* | 1/2016 | Fellers | G10L 19/012 704/205 |
| 2016/0232901 | A1 | 8/2016 | Ghido et al. | |
| 2016/0307578 | A1* | 10/2016 | Rose | G10L 19/09 |
| 2018/0261234 | A1 | 9/2018 | Qi et al. | |
| 2019/0096411 | A1* | 3/2019 | Zhang | G10L 19/008 |
| 2021/0210104 | A1 | 7/2021 | Laaksonen et al. | |
| 2021/0407525 | A1 | 12/2021 | Vasilache et al. | |
| 2022/0007126 | A1* | 1/2022 | Bruhn | H04S 3/02 |
| 2023/0402053 | A1 | 12/2023 | Laitinen et al. | |

FOREIGN PATENT DOCUMENTS

| | | | |
|---|---|---|---|
| CN | 102208188 | A | 1/2011 |
| CN | 112513981 | A | 3/2021 |
| CN | 112997248 | A | 6/2021 |
| CN | 114846542 | A | 8/2022 |
| EP | 2509308 | A1 | 10/2012 |
| EP | 2690621 | A1 | 1/2014 |
| EP | 2830047 | A1 | 1/2015 |
| EP | 2633520 | B1 | 9/2015 |
| EP | 3451331 | A1 | 3/2019 |
| JP | 2008517339 | A | 5/2008 |
| WO | 2012/058805 | A1 | 5/2012 |
| WO | 2012/158333 | A1 | 11/2012 |
| WO | 2013/149671 | A1 | 10/2013 |
| WO | 2016/014254 | A1 | 1/2016 |
| WO | 2017/005978 | A1 | 1/2017 |
| WO | 2019/086757 | A1 | 5/2019 |
| WO | 2020/008105 | A1 | 1/2020 |
| WO | 2020/070377 | A1 | 4/2020 |
| WO | 2020/089510 | A1 | 5/2020 |

OTHER PUBLICATIONS

Definition of "Monitor" at Merriam-Webster dictionary, available at https://web.archive.org/web/20170910055240/https://www.merriam-webster.com/dictionary/monitor (archived on Sep. 10, 2017)) (Year: 2017).*

3GPP TSG-SA4#102, Doc. S4-190121, Nokia Corp., available at https://www.3gpp.org/ftp/TSG_SA/WG4_CODEC/TSGS4_102_Bruges/Docs/S4-190121.zip (Jan. 22, 2019) (Year: 2019).*

"Proposal for MASA common metadata and metadata structure", 3GPP TSG-SA4#101 meeting, S4-181353, Agenda: 7.5, Nokia Corporation, Nov. 19-23, 2018, pp. 1-4.

Search Report received for corresponding United Kingdom Patent Application No. 1904303.3, dated Sep. 24, 2019, 3 pages.

International Search Report and Written Opinion received for corresponding Patent Cooperation Treaty Application No. PCT/FI2020/050194, dated Sep. 11, 2020, 16 pages.

"Proposal for MASA format", 3GPP TSG-SA4#102 meeting, S4-190121, Agenda: 7.5, Nokia Corporation, Jan. 28-Feb. 1, 2019, pp. 1-10.

Office action received for corresponding Indian Patent Application No. 202147048911, dated Mar. 24, 2022, 7 pages.

Office Action received for corresponding Japanese Patent Application No. 2021-557812, dated Sep. 26, 2022, 2 pages of Office Action and 3 pages of summary available.

Extended European Search Report received for corresponding European Patent Application No. 20778687.2, dated Oct. 11, 2022, 7 pages.

Office Action for Chinese Application No. 202080024931.9 dated Mar. 27, 2024, 12 pages.

Office Action for Korean Application No. 10-2021-7034950 dated Jan. 24, 2024, 10 pages.

Office Action for Chinese Application No. 202080024931.9 dated Jul. 27, 2024, 6 pages.

Office Action for Mexican Application No. MX/a/2021/011856 dated Aug. 13, 2024, 8 pages.

* cited by examiner

DETERMINATION OF THE SIGNIFICANCE OF SPATIAL AUDIO PARAMETERS AND ASSOCIATED ENCODING

RELATED APPLICATION

This application was originally filed as PCT Application No. PCT/FI2020/050194, filed on Mar. 26, 2020, which claims priority from GB Application No. 1904303.3, filed on Mar. 28, 2019, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance etc) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals, and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However, with respect to the components of the spatial metadata the compression and encoding of the coherence parameters is of considerable interest in order to minimise the overall number of bits required to represent the spatial audio parameters.

SUMMARY

There is provided according to a first aspect an apparatus for spatial audio encoding comprising: means for receiving or determining for one or more audio signals, spatial audio parameters on a sub band basis for providing spatial audio reproduction, wherein the spatial audio parameters comprise a coherence value for each sub band of a plurality of sub-bands of a frame; means for determining a significance measure for the coherence values of the plurality of sub bands of the frame; and means for using the significance measure to determine whether to encode the coherence values of the plurality of sub bands of the frame.

The apparatus may further comprise means for receiving an energy ratio value for each of the plurality of sub bands, wherein the means for determining the significance measure for the coherence values of the plurality of sub bands of the frame may comprise: means for determining a proportion of coherent non-directional energy for each of the plurality of sub bands, wherein the proportion of coherent non-directional energy for a sub band is determined as a non-directional energy ratio for the sub band multiplied by the coherence value for the sub band, wherein the non-directional energy ratio is related to the ratio of energy in the sub band remaining after the energy ratio value for the sub band has been removed; and means for summing, for all the plurality of sub bands, the determined proportion of coherent non-directional energy.

The means for determining the significance measure for the coherence values of the plurality of sub bands of the frame may further comprise: means for multiplying, for each sub band, the proportion of coherent non-directional energy by the non-directional energy ratio; means for summing, for all the plurality of sub bands, the multiple of the proportion of coherent non-directional energy and the non-directional energy ratio for each sub band; and means for normalising the summed multiple of the proportion of coherent non-directional energy and the non-directional energy ratio for each sub band by a summation of the non-directional energy ratio for each sub band.

The significance measure for the coherence values of the plurality of sub bands of the frame may be a first significance measure for the coherence values of the plurality of sub bands of the frame.

The significance measure for the coherence values of the plurality of sub bands of the frame may be a second significance measure for the coherence values of the plurality of sub bands of the frame.

The means for determining the significance measure for the coherence values of the plurality of sub bands of the frame may comprise: means for determining the significance measure for the coherence values of the plurality of sub bands of the frame as the maximum of the first significance measure and the second significance measure.

The means for using the significance measure to determine whether to encode the coherence values of the plurality of sub bands of the frame may comprise: means for comparing the significance measure against a threshold value; and means for encoding the coherence values of the plurality of sub bands of the frame when the significance measure exceeds the threshold value.

The coherence value for each of the plurality of sub-bands may be a surrounding coherence value, wherein the surrounding coherence value may be determined based on an inter-channel coherence between the two or more channel audio signals.

The surrounding coherence value for each of the plurality of sub bands may be determined by the apparatus comprising means for: computing a covariance matrix associated with the two or more channel audio signals; monitoring a channel audio signal with a largest energy determined based on the covariance matrix and a sub-set of other channel audio signals, wherein the sub-set is a determined number between 1 and one less than a total number of channel audio signals with the next largest energies; and generating the surrounding covariance parameter based on selecting the minimum of normalized coherences determined between the channel audio signal with the largest energy and each of the next largest energy channel audio signals.

The energy ratio value for each of the sub bands may be a direct-to-total energy ratio value for each of the sub bands.

The non-directional energy ratio for a sub band is determined as one minus the direct-to-total energy ratio for the sub band.

According to a second aspect there is a method for spatial audio encoding comprising: receiving or determining for one or more audio signals, spatial audio parameters on a sub band basis for providing spatial audio reproduction, wherein the spatial audio parameters comprise a coherence value for each sub band of a plurality of sub-bands of a frame; determining a significance measure for the coherence values of the plurality of sub bands of the frame; and using the significance measure to determine whether to encode the coherence values of the plurality of sub bands of the frame.

The method may further comprise receiving an energy ratio value for each of the plurality of sub bands, wherein the means for determining the significance measure for the coherence values of the plurality of sub bands of the frame may comprise: determining a proportion of coherent non-directional energy for each of the plurality of sub bands, wherein the proportion of coherent non-directional energy for a sub band is determined as a non-directional energy ratio for the sub band multiplied by the coherence value for the sub band, wherein the non-directional energy ratio is related to the ratio of energy in the sub band remaining after the energy ratio value for the sub band has been removed; and summing, for all the plurality of sub bands, the determined proportion of coherent non-directional energy.

Determining the significance measure for the coherence values of the plurality of sub bands of the frame further may comprise: multiplying, for each sub band, the proportion of coherent non-directional energy by the non-directional energy ratio; summing, for all the plurality of sub bands, the multiple of the proportion of coherent non-directional energy and the non-directional energy ratio for each sub band; and normalising the summed multiple of the proportion of coherent non-directional energy and the non-directional energy ratio for each sub band by a summation of the non-directional energy ratio for each sub band.

The significance measure for the coherence values of the plurality of sub bands of the frame may be a first significance measure for the coherence values of the plurality of sub bands of the frame.

The significance measure for the coherence values of the plurality of sub bands of the frame may be a second significance measure for the coherence values of the plurality of sub bands of the frame.

Determining the significance measure for the coherence values of the plurality of sub bands of the frame may comprise: determining the significance measure for the coherence values of the plurality of sub bands of the frame as the maximum of the first significance measure and the second significance measure.

Using the significance measure to determine whether to encode the coherence values of the plurality of sub bands of the frame may comprise: comparing the significance measure against a threshold value; and encoding the coherence values of the plurality of sub bands of the frame when the significance measure exceeds the threshold value.

The coherence value for each of the plurality of sub-bands may be a surrounding coherence value, wherein the surrounding coherence value may be determined based on an inter-channel coherence between the two or more channel audio signals.

The surrounding coherence value for each of the plurality of sub bands may be determined by the apparatus comprising: computing a covariance matrix associated with the two or more channel audio signals; monitoring a channel audio signal with a largest energy determined based on the covariance matrix and a sub-set of other channel audio signals, wherein the sub-set is a determined number between 1 and one less than a total number of channel audio signals with the next largest energies; and generating the surrounding covariance parameter based on selecting the minimum of normalized coherences determined between the channel audio signal with the largest energy and each of the next largest energy channel audio signals.

The energy ratio value for each of the sub bands may be a direct-to-total energy ratio value for each of the sub bands.

The non-directional energy ratio for a sub band may be determined as one minus the direct-to-total energy ratio for the sub band.

There is provided according to a third aspect an apparatus for spatial audio encoding, the apparatus comprising at least one processor and at least one memory including a computer program code, the at least one memory and the computer code configured to: receive or determine for one or more audio signals, spatial audio parameters on a sub band basis for providing spatial audio reproduction, wherein the spatial audio parameters comprise a coherence value for each sub band of a plurality of sub-bands of a frame; determine a significance measure for the coherence values of the plurality of sub bands of the frame; and use the significance measure to determine whether to encode the coherence values of the plurality of sub bands of the frame.

The apparatus may be further caused to receive an energy ratio value for each of the plurality of sub bands, wherein the apparatus caused to determine the significance measure for the coherence values of the plurality of sub bands of the frame may be caused to: determine a proportion of coherent non-directional energy for each of the plurality of sub bands, wherein the proportion of coherent non-directional energy for a sub band is determined as a non-directional energy ratio for the sub band multiplied by the coherence value for the sub band, wherein the non-directional energy ratio is related to the ratio of energy in the sub band remaining after the energy ratio value for the sub band has been removed; and sum, for all the plurality of sub bands, the determined proportion of coherent non-directional energy.

The apparatus caused to determine the significance measure for the coherence values of the plurality of sub bands of the frame may be further caused to: multiply, for each sub band, the proportion of coherent non-directional energy by the non-directional energy ratio; sum, for all the plurality of sub bands, the multiple of the proportion of coherent non-directional energy and the non-directional energy ratio for each sub band; and normalise the summed multiple of the proportion of coherent non-directional energy and the non-directional energy ratio for each sub band by a summation of the non-directional energy ratio for each sub band.

The significance measure for the coherence values of the plurality of sub bands of the frame may be a first significance measure for the coherence values of the plurality of sub bands of the frame.

The significance measure for the coherence values of the plurality of sub bands of the frame may be a second significance measure for the coherence values of the plurality of sub bands of the frame.

The apparatus caused to determine the significance measure for the coherence values of the plurality of sub bands of the frame maybe caused to: determine the significance measure for the coherence values of the plurality of sub bands of the frame as the maximum of the first significance measure and the second significance measure.

The apparatus caused to use the significance measure to determine whether to encode the coherence values of the plurality of sub bands of the frame may be caused to: compare the significance measure against a threshold value; and encode the coherence values of the plurality of sub bands of the frame when the significance measure exceeds the threshold value.

The coherence value for each of the plurality of sub-bands may be a surrounding coherence value, wherein the surrounding coherence value may be determined based on an inter-channel coherence between the two or more channel audio signals.

The surrounding coherence value for each of the plurality of sub bands may be determined by the apparatus being caused to: compute a covariance matrix associated with the two or more channel audio signals; monitor a channel audio signal with a largest energy determined based on the covariance matrix and a sub-set of other channel audio signals, wherein the sub-set is a determined number between 1 and one less than a total number of channel audio signals with the next largest energies; and generate the surrounding covariance parameter based on selecting the minimum of normalized coherences determined between the channel audio signal with the largest energy and each of the next largest energy channel audio signals.

The energy ratio value for each of the sub bands may be a direct-to-total energy ratio value for each of the sub bands.

The non-directional energy ratio for a sub band may be determined as one minus the direct-to-total energy ratio for the sub band.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals.

The metadata consists at least of direction (elevation, azimuth), energy ratio of a resulting direction, and surround coherence independent of the direction, for each considered time-frequency (TF) block or tile, in other words a time/frequency sub band. In addition, a spread coherence may be determined and included for each TF block. All this data is encoded and transmitted (or stored) by the encoder in order to be able to reconstruct the spatial signal at the decoder.

Typical overall operating bitrates of the codec may leave 2 to 10 kbps for the transmission/storage of spatial metadata. However, some further implementations may allow up to 20 kps for the transmission/storage of spatial metadata. The encoding of the direction parameters and energy ratio components has been examined before. However, the encoding of the coherence data requires further investigation in order to minimise the overall operating bitrates needed for encoding the spatial metadata.

The concept as discussed hereafter is to encode the coherence parameters along with the direction and energy ratio parameters for each time-frequency block. In particular scenarios it may be possible to regulate the encoding of coherence parameters for a frame in accordance with their subjective significance to a listener. For instance, it may be determined, for an audio frame, that the coherence parameter for each sub band may contribute no subjective significance with respect to surrounding sub bands. In such instances a saving in operating bitrate can be achieved by not encoding the coherence parameters for the frame.

Accordingly, the invention proceeds from the consideration that for certain circumstances an overall saving in the number of bits used to encode coherence parameters. This may be achieved by having a measure which would provide an indication of the subjective significance of each sub band's coherence value in relation to surrounding sub bands and to use the results of the measure to determine if the coherence parameters should be encoded for the frame.

Figure 1:
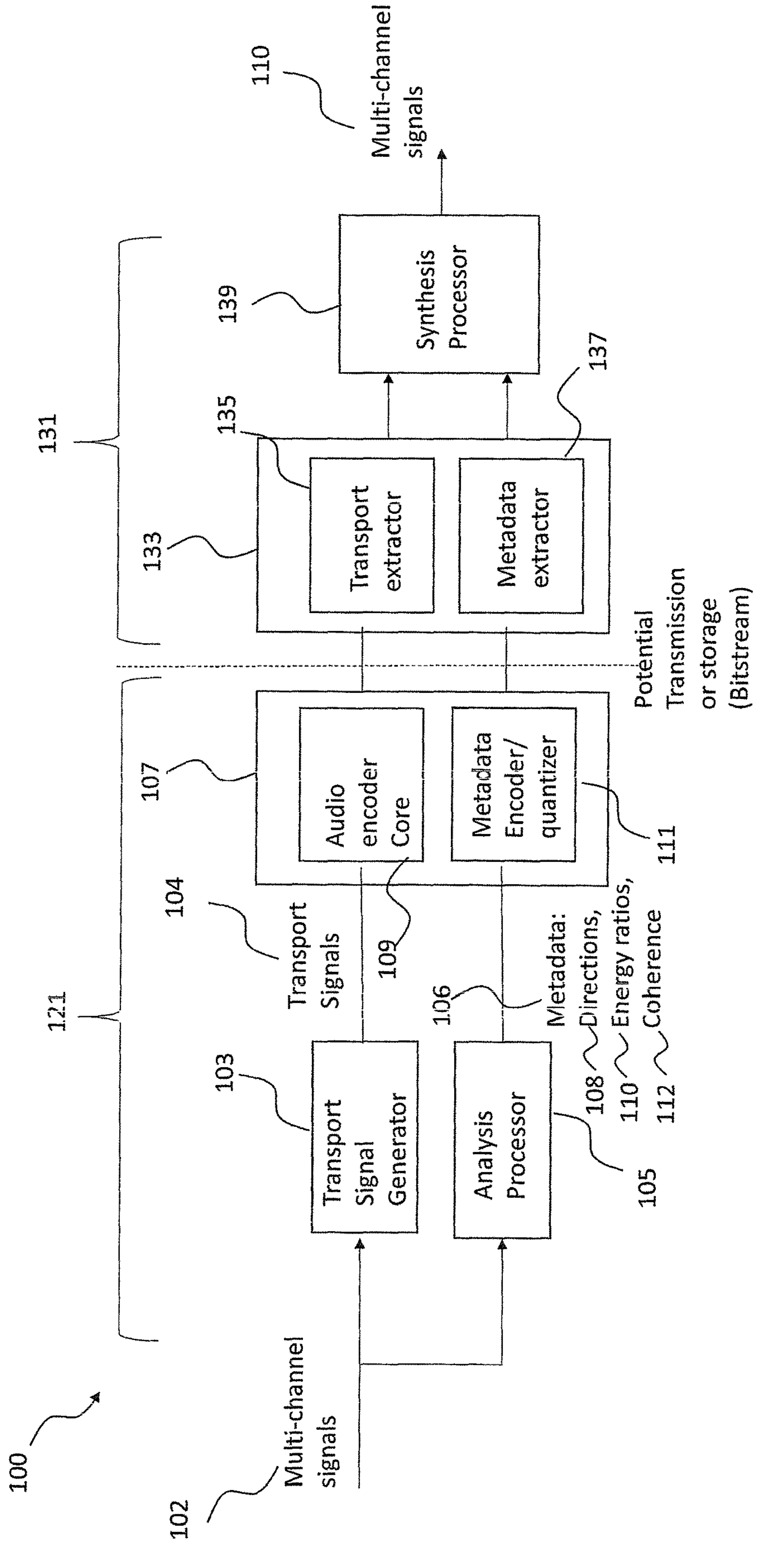
FIG. 1 shows schematically a system of apparatus suitable for implementing some embodiments.

In this regard FIG. 1 depicts an example apparatus and system for implementing embodiments of the application are shown. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be a provided to an encoder as a separate bit-stream. In some embodiments the spatial metadata may be provided as a set of spatial (direction) index values.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be spatial audio parameters. In other words, the spatial audio parameters comprise parameters which aim to characterize the sound-field created by the multi-channel signals (or two or more playback audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels).

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata.

Figure 2:
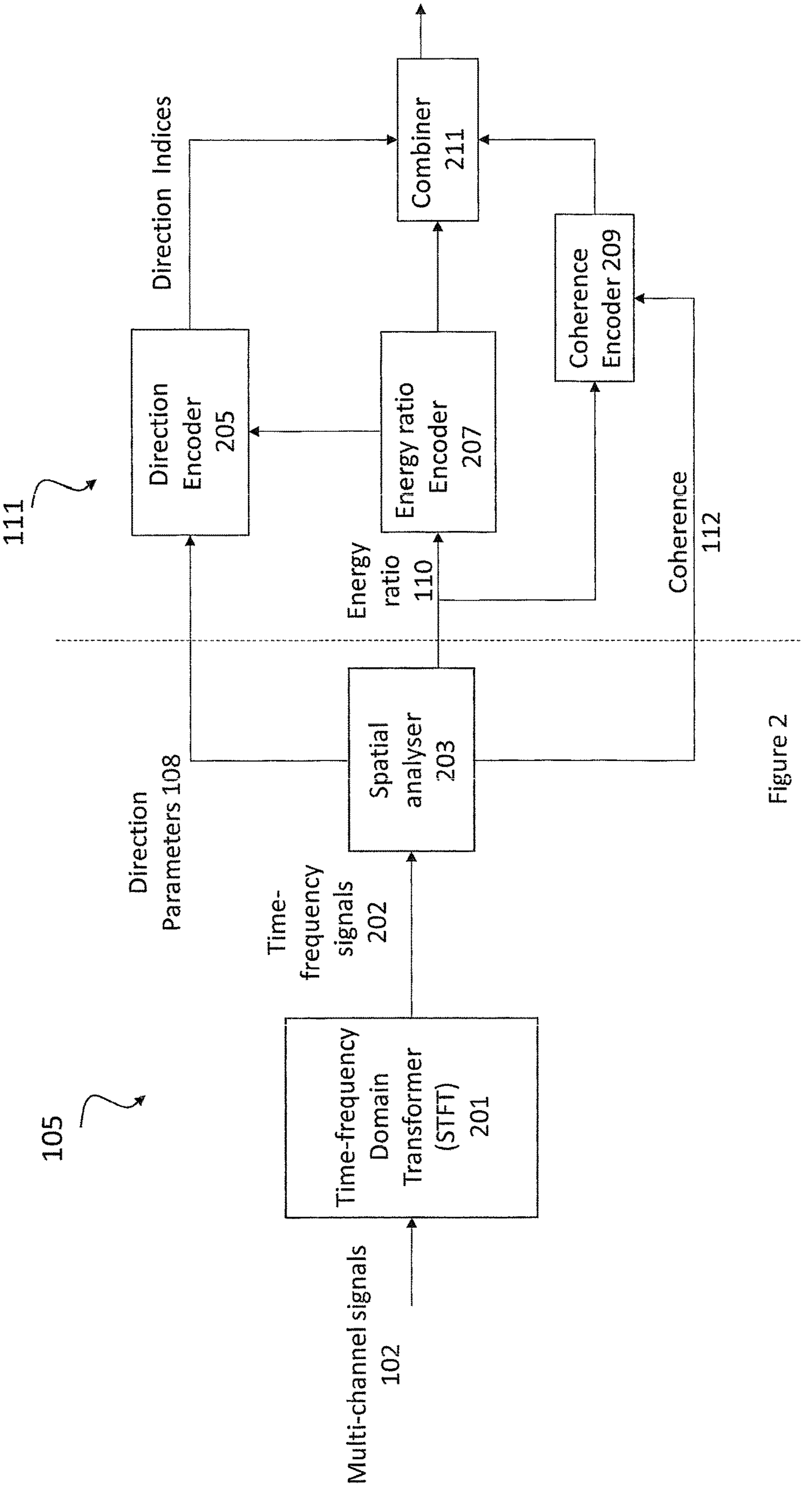
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

In some embodiments the analysis processor 105 comprises a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction with two or more signal inputs. This represents the simplest configuration to estimate a 'direction', more complex processing may be performed with even more signals.

The spatial analyser 203 may thus be configured to provide at least one azimuth and elevation for each frequency band and temporal time-frequency block within a frame of an audio signal, denoted as azimuth φ(k,n) and elevation θ(k,n). The direction parameters 108 may be also be passed to a direction encoder 205.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k,n) between a microphone pair at band k, the value of the cross-correlation parameter lies between −1 and 1. The direct-to-energy ratio parameter r(k,n) can be determined by comparing the normalized cross-correlation parameter to a diffuse field normalized cross correlation parameter $cor'_D(k,n)$ as $$r(k,n) = \frac{cor'(k,n) - cor'_D(k,n)}{1 - cor'_D(k,n)}.$$

The direct-to-total energy ratio is explained further in PCT publication WO2017/005978 which is incorporated herein by reference.

The energy ratio may be passed to an energy ratio encoder 207.

The spatial analyser 203 may furthermore be configured to determine a number of coherence parameters 112 which may include surrounding coherence (γ(k,n)) and spread coherence (ζ(k, n)), both analysed in time-frequency domain.

Each of the aforementioned coherence issues parameters are next discussed. All the processing is performed in the time-frequency domain, so the time-frequency indices k and n are dropped where necessary for brevity.

Let us first consider the situation where the sound is reproduced coherently using two spaced loudspeakers (e.g., front left and right) instead of a single loudspeaker. The coherence analyser may be configured to detect that such a method has been applied in surround mixing.

In some embodiments therefore the spatial analyser 203 may be configured to calculate, the covariance matrix C for the given analysis interval consisting of one or more time indices n and frequency bins b. The size of the matrix is $N_L \times N_L$, and the entries are denoted as $c_{ij}$, where $N_L$ is the number of loudspeaker channels, and i and j are loudspeaker channel indices.

Next, the spatial analyser 203 may be configured to determine the loudspeaker channel $i_c$ closest to the estimated direction (which in this example is azimuth θ).

$$i_c = \arg(\min(|\theta - \alpha_i|))$$

where $\alpha_i$ is the angle of the loudspeaker i.

Furthermore, in such embodiments the spatial analyser 203 is configured to determine the loudspeakers closest on the left $i_l$ and the right $i_r$ side of the loudspeaker $i_c$.

A normalized coherence between loudspeakers i and j is denoted as $$c'_{ij} = \frac{|c_{ij}|}{\sqrt{|c_{ii} c_{jj}|}},$$

using this equation, the spatial analyser 203 may be configured to calculate a normalized coherence $c'_{lr}$ between $i_l$ and $i_r$. In other words, calculate $$c'_{lr} = \frac{|c_{lr}|}{\sqrt{|c_{ll} c_{rr}|}}.$$

Furthermore, the spatial analyser 203 may be configured to determine the energy of the loudspeaker channels i using the diagonal entries of the covariance matrix $$E_i = c_{ii},$$

and determine a ratio between the energies of the $i_l$ and $i_r$ loudspeakers and $i_l$, $i_r$, and $i_c$ loudspeakers as $$\xi_{lr/lrc} = \frac{E_l + E_r}{E_l + E_r + E_c}.$$

The spatial analyser 203 may then use these determined variables to generate a 'stereoness' parameter $$\mu = c'_{lr}\xi_{lr/lrc}.$$

This 'stereoness' parameter has a value between 0 and 1. A value of 1 means that there is coherent sound in loudspeakers $i_l$ and $i_r$ and this sound dominates the energy of this sector. The reason for this could, for example, be the loudspeaker mix used amplitude panning techniques for creating an "airy" perception of the sound. A value of 0 means that no such techniques has been applied, and, for example, the sound may simply be positioned to the closest loudspeaker.

Furthermore, the spatial analyser 203 may be configured to detect, or at least identify, the situation where the sound is reproduced coherently using three (or more) loudspeakers for creating a "close" perception (e.g., use front left, right and centre instead of only centre). This may be because a soundmixing engineer produces such a situation in surround mixing the multichannel loudspeaker mix.

In such embodiments the same loudspeakers $i_l$, $i_r$, and $i_c$ identified earlier are used by the coherence analyser to determine normalized coherence values $c'_{cl}$ and $c'_{cr}$ using the normalized coherence determination discussed earlier. In other words the following values are computed:

$$c'_{cl} = \frac{|c_{cl}|}{\sqrt{|c_{cc}c_{ll}|}},\ c'_{cr} = \frac{|c_{cr}|}{\sqrt{|c_{cc}c_{rr}|}}.$$

The spatial analyser 203 may then determine a normalized coherence value $c'_{clr}$ depicting the coherence among these loudspeakers using the following:

$$c'_{clr} = \min(c'_{cl}, c'_{cr}).$$

In addition, the spatial analyser 203 may be configured to determine a parameter that depicts how evenly the energy is distributed between the channels $i_l$, $i_r$, and $i_c$, $$\xi_{clr} = \min\left(\frac{E_l}{E_c}, \frac{E_c}{E_l}, \frac{E_r}{E_c}, \frac{E_c}{E_r}\right).$$

Using these variables, the spatial analyser 203 may determine a new coherent panning parameter κ as, $$\kappa = c'_{clr}\xi_{clr}.$$

This coherent panning parameter κ has values between 0 and 1. A value of 1 means that there is coherent sound in all loudspeakers $i_l$, $i_r$, and $i_c$, and the energy of this sound is evenly distributed among these loudspeakers. The reason for this could, for example, be because the loudspeaker mix was generated using studio mixing techniques for creating a perception of a sound source being closer. A value of 0 means that no such technique has been applied, and, for example, the sound may simply be positioned to the closest loudspeaker.

The spatial analyser 203 determined "stereoness" parameter μ which measures the amount of coherent sound in $i_l$ and $i_r$ (but not in $i_c$), and coherent panning parameter κ which measures the amount of coherent sound in all $i_l$, $i_r$, and $i_c$ is configured to use these to determine coherence parameters to be output as metadata.

Thus, the spatial analyser 203 is configured to combine the "stereoness" parameter μ and coherent panning parameter κ to form a spread coherence ζ parameter, which has values from 0 to 1. A spread coherence ζ value of 0 denotes a point source, in other words, the sound should be reproduced with as few loudspeakers as possible (e.g., using only the loudspeaker $i_c$). As the value of the spread coherence ζ increases, more energy is spread to the loudspeakers around the loudspeaker $i_c$; until at the value 0.5, the energy is evenly spread among the loudspeakers $i_l$, $i_r$, and $i_c$. As the value of spread coherence ζ increases over 0.5, the energy in the loudspeaker $i_c$ is decreased; until at the value 1, there is no energy in the loudspeaker $i_c$, and all the energy is at loudspeakers $i_l$ and $i_r$.

Using the aforementioned parameters μ and κ, the spatial analyser 203 is configured in some embodiments to determine a spread coherence parameter ζ, using the following expression:

$$\zeta = \begin{cases} \max(0.5, \mu - \kappa + 0.5), & \text{if } \max(\mu, \kappa) > 0.5\ \&\ \kappa > \mu \\ \max(\mu, \kappa), & \text{else} \end{cases}.$$

The above expression is an example only and it should be noted that the spatial analyser 203 may estimate the spread coherence parameter ζ in any other way as long as it complies with the above definition of the parameter.

As well as being configured to detect the earlier situations the spatial analyser 203 may be configured to detect, or at least identify, the situation where the sound is reproduced coherently from all (or nearly all) loudspeakers for creating an "inside-the-head" or "above" perception.

In some embodiments spatial analyser 203 may be configured to sort, the energies $E_i$, and the loudspeaker channel $i_e$ with the largest value determined.

The spatial analyser 203 may then be configured to determine the normalized coherence $c'_{ij}$ between this channel and $M_L$ other loudest channels. These normalized coherence $c'_{ij}$ values between this channel and $M_L$ other loudest channels may then be monitored. In some embodiments $M_L$ may be $N_L-1$, which would mean monitoring the coherence between the loudest and all the other loudspeaker channels. However, in some embodiments $M_L$ may be a smaller number, e.g., $N_L-2$. Using these normalized coherence values, the coherence analyser may be configured to determine a surrounding coherence parameter γ using the following expression:

$$\gamma = \min_{M}(c'_{i_e j}),$$

where $c'_{i_e j}$ are the normalized coherences between the loudest channel and $M_L$ next loudest channels.

The surrounding coherence parameter γ has values from 0 to 1. A value of 1 means that there is coherence between all (or nearly all) loudspeaker channels. A value of 0 means that there is no coherence between all (or even nearly all) loudspeaker channels.

The above expression is only one example of an estimate for a surrounding coherence parameter $\gamma$, and any other way can be used, as long as it complies with the above definition of the parameter.

Following this the analysis processor 203 may apply direction analysis to determine direction and energy ratio parameters.

The analysis processor 203 may then be configured to output the determined parameters.

Although directions, energy ratios, and coherence parameters are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

In some embodiments the directional data may be represented using 16 bits. In such embodiments the energy ratio parameter may be represented on 8 bits. For each frame there may be 5 sub bands and 4 time frequency (TF) blocks. Thus in this example there are $(16+8)\times4\times5$ bits needed to store the uncompressed direction and energy ratio metadata for each frame. The coherence data for each TF block may be a representation between 0 and 1 and may be originally represented on 8 bits.

As also shown in FIG. 2 an example metadata encoder/quantizer 111 is shown according to some embodiments.

The metadata encoder/quantizer 111 may comprise a direction encoder 205. The direction encoder 205 is configured to receive the direction parameters (such as the azimuth $\varphi(k, n)$ and elevation $\theta(k, n)$ 108 (and in some embodiments an expected bit allocation) and from this generate a suitable encoded output. In some embodiments the encoding is based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

Furthermore, in some embodiments the direction encoder 205 is configured to determine a variance of the azimuth parameter value and pass this to the coherence encoder 209.

The encoded direction parameters may then be passed to the combiner 211.

The metadata encoder/quantizer 111 may comprise an energy ratio encoder 207. The energy ratio encoder 207 is configured to receive the energy ratios and determine a suitable encoding for compressing the energy ratios for the sub-bands and the time-frequency blocks. For example, in some embodiments the energy ratio encoder 207 is configured to use 3 bits to encode each energy ratio parameter value.

Furthermore, in some embodiments rather than transmitting or storing all energy ratio values for all TF blocks, only one weighted average value per sub-band is transmitted or stored. The average may be determined by taking into account the total energy of each time block, favouring thus the values of the sub-bands having more energy.

In such embodiments the quantized energy ratio value is the same for all the TF blocks of a given sub-band.

In some embodiments the energy ratio encoder 207 is further configured to pass the quantized (encoded) energy ratio value to the combiner 211 and to the coherence encoder 209.

The metadata encoder/quantizer 111 may comprise a coherence encoder 209. The coherence encoder 209 is configured to receive the coherence values and determine a suitable encoding for compressing the coherence values for the sub-bands and the time-frequency blocks. A 3-bit precision value for the coherence parameter values has been shown to produce acceptable audio synthesis results but even then this would require a total of $3\times20$ bits for the coherence data for all TF blocks (in the example 8 sub-band and 5 TF block per frame).

Therefore an objective of embodiments is to reduce the number of bits to represent the coherence data over the course of a number of TF blocks.

The encoded coherence parameter values may then be passed to the combiner 211.

The metadata encoder/quantizer 111 may comprise a combiner 211. The combiner is configured to receive the encoded (or quantized/compressed) directional parameters, energy ratio parameters and coherence parameters and combine these to generate a suitable output (for example a metadata bit stream which may be combined with the transport signal or be separately transmitted or stored from the transport signal).

Figure 3:
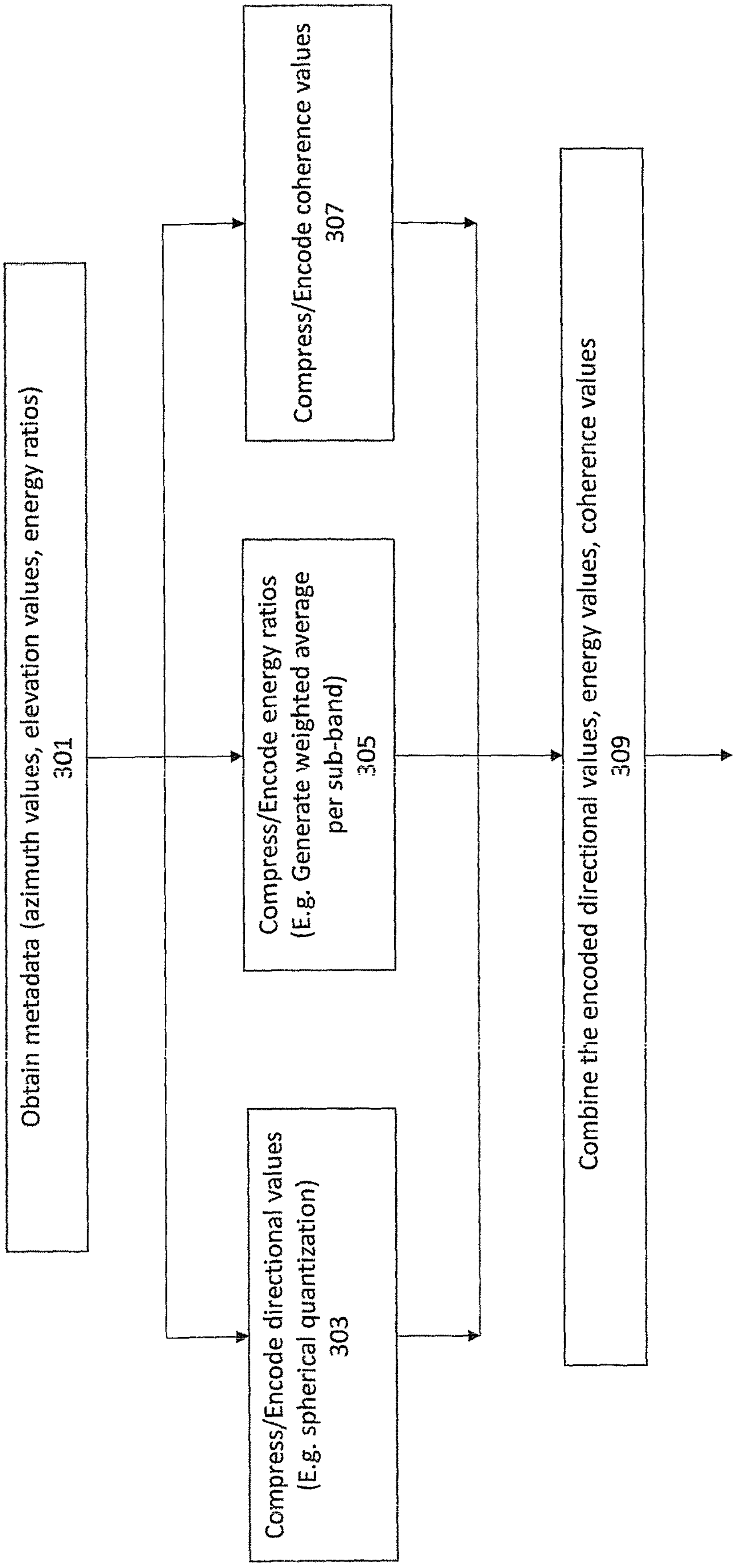
FIG. 3 shows a flow diagram of the operation of the metadata encoder as shown in FIG. 2 according to some embodiments.

With respect to FIG. 3 is shown an example operation of the metadata encoder/quantizer as shown in FIG. 2 according to some embodiments.

The initial operation is obtaining the metadata (such as azimuth values, elevation values, energy ratios, coherence etc) as shown in FIG. 3 by step 301.

The directional values (elevation, azimuth) may then be compressed or encoded (for example by applying a spherical quantization, or any suitable compression) as shown in FIG. 3 by step 303.

The energy ratio values are compressed or encoded (for example by generating a weighted average per sub-band and then quantizing these as a 3 bit value) as shown in FIG. 3 by step 305.

The coherence values are also compressed or encoded as shown in FIG. 3 by step 307.

The encoded directional values, energy ratios, coherence values are then combined to generate the encoded metadata as shown in FIG. 3 by step 309.

Figure 4:
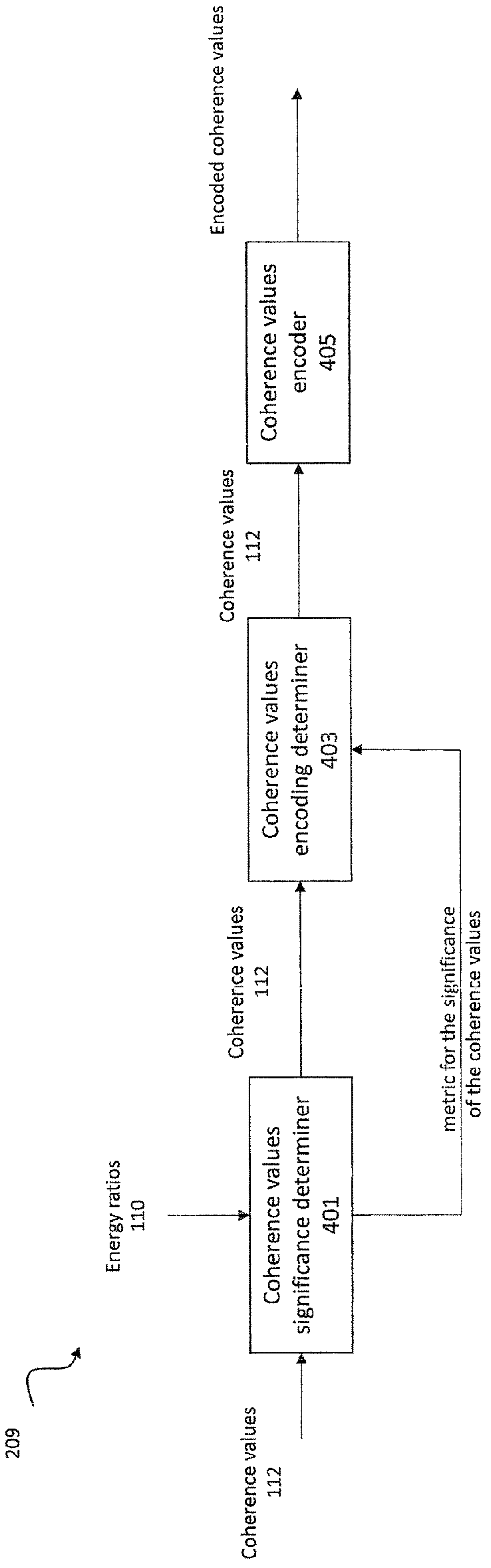
FIG. 4 shows schematically the coherence encoder as shown in FIG. 2 according to some embodiments.

With respect to FIG. 4 is shown an example coherence encoder 209 as shown in FIG. 2.

As mentioned earlier a technical benefit can be achieved by regulating the encoding of coherence parameters in which for some audio frames the coherence parameters are encoded and consequently form part of the encoded bitstream and for other audio frames the coherence parameters are not encoded. The technical benefit being the overall decrease in the bit rate of the encoded bitstream.

The decision whether to encode the coherence parameters may be made based on the subjective significance of each sub band's coherence value in relation to surrounding sub bands. In other words, the decision to encode the coherence parameters can be made based on whether the coherence parameters contribute to the overall perceptual listening experience of the end user.

Listening experiments have demonstrated that the perception of coherence in the spatial audio signal can at least in part be attributed to the interaction between the signals present in the various frequency bands. This may appear contrary to the premise that for the perception of sound the human frequency resolution may be siloed/compartmentalized according to non-linear frequency scales such as equivalent rectangular bandwidth (ERB).

For instance, it was noticed through experimentation (comprising perceptual listening tests) that if the coherence is low for most of the frequency bands a higher coherence in a single frequency band can have an insignificant contribution to the perception of the spatial audio. Consequently, in this instance it may be beneficial to the overall bitrate of the encoded bitstream not to encode the coherence parameter.

Alternatively, it was also noticed through perceptual listening tests that if a single frequency band was found to have a significantly lower energy ratio than other surrounding frequency bands the coherence may be perceptually significant at that band. In this case it was found that the human hearing system may be particularly sensitive. Consequently, it would be prudent to transmit the coherence parameters for the frame in order to enhance the overall listening experience of the spatial audio.

Therefore, the results of experimental observations would suggest that a metric (or measure) may be devised which represents the significance of the coherence in the spatial audio signal.

These effects can be particularly prevalent for perception of surround coherence in the spatial audio signal. However, measuring the significance of other types of coherence parameters may also have a benefit when it comes to deciding whether to encode the coherence parameters. For instance, techniques such as these may also be applied to spread coherence parameter values.

As stated above these effects can be attributed to the interaction between the frequency bands when it comes to the perception of the coherence.

In this regard reference is first made to 401 in FIG. 4 where a coherence value significance determiner is depicted as receiving the coherence values of each sub band k for the TF block n. Additionally, 401 may be also be arranged to receive the direct-to-total energy ratios r(k,n) for the TF block n (or subframe n), that is the energy ratios associated with the K sub bands of the TF block with time index n. Similarly, the coherence values are also delivered to the coherence value significance determiner 401 as K coherence values for the K sub bands of the TF block with time index n.

In a first embodiment the coherence values may comprise the surrounding coherence (γ(k,n)). It is to be noted that k is used to indicate the sub band index and n is the index of the TF block.

Figure 5:
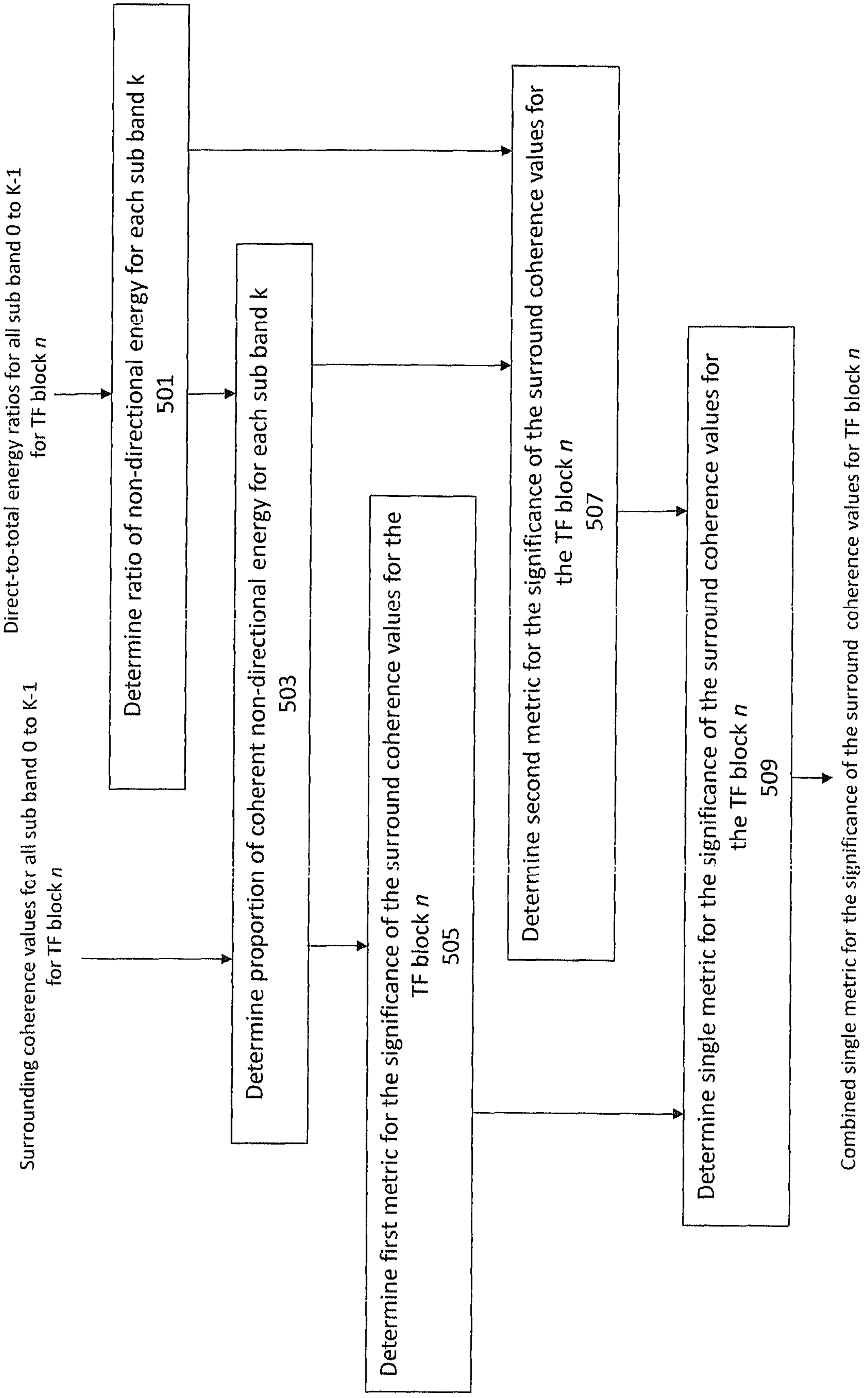
FIG. 5 shows a flow diagram of the operation of the coherence values significance determiner shown in FIG. 4 according to some embodiments.

Reference is also made to FIG. 5 which depict example processing steps for determining the significance of the surround coherence values for a TF block comprising K sub bands.

Initially the processing block 401 may determine an estimate of the non-directional energy ratio for each sub band k by using the direct-to-total energy ratio r(k,n). In embodiments the non-directional (surrounding) energy ratio a(k, n) can be given by $$a(k,n)=1-r(k,n) \text{ for } k=0 \text{ to } K-1$$

It is to be noted that r(k,n) is the energy in a particular direction over the total energy, the direction for each frequency is given by the azimuth and elevation. As mentioned earlier the direction is represented by a direction index from the Direction encoder 205. The energy ratio r(k, n) can have a value between 0 and 1, where a 1 would signify that that the total energy is concentrated along one direction index for a sub band k. Therefore a(k, n) represents the ratio of surrounding (or non-directional) energy for the particular sub band k, in other words energy which is not concentrated along a particular direction index.

The processing step of determining the ratio of non-directional (surrounding) energy is shown as 501 in FIG. 5.

The proportion of coherent non-directional (surrounding) energy for each sub band k can therefore be given by $$\rho(k,n)=a(k,n)\gamma(k,n) \text{ for } k=0 \text{ to } K-1$$

The processing step of determining the proportion of non-directional (surrounding) energy for each sub band is depicted as processing step 503 in FIG. 5.

A first measure (or metric) for the significance of the surround coherence values for the TF block n (or subframe n) can be estimated by summing the proportion of non-directional energies across all sub bands for the subframe n.

$$\xi_1(n)=\frac{1}{K}\sum_k \rho(k,n)$$

The first measure, $\xi_1$, may be seen to give an indication if non-directional (surround) energy is prominent in multiple frequency sub bands of the sub frame n.

The processing step of determining the first measure for the significance of the surround coherence values for the subframe n is depicted as processing step 505 in FIG. 5.

A second measure (or metric), $\xi_2$, for the significance of the surround coherence values for the subframe n can be estimated by taking the proportion of non-directional energy ρ(k,n) and weighting it with the ratio of surrounding (or non-directional) energy for the particular sub band k, a(k,n). This can be summed across all sub bands and normalized with the "total" ratio of surrounding (or non-directional) energies. The second measure, $\xi_2$, may be expressed as $$\xi_2(n)=\mu\frac{\sum_k a(k,n)\rho(k,n)}{\sum_k a(k,n)},$$

where μ is a tuning factor. Experimental observations have shown a value of μ=0.4 may produce an advantageous result.

The second measure (or metric), $\xi_2$, may be seen to provide a measure whether surround coherent energy is prominent within sub bands which are predominantly non-direction, and thus provide an indication as to whether the surround coherence values in the subframe provide may be perceptually significant and therefore the coherence values should be encoded and transmitted.

The processing step of determining the second measure for the significance of the surround coherence parameter for the TF (subframe) n is depicted as processing step 507 in FIG. 5.

In embodiments the first and second measures may be merged to provide a single measure for the significance of the surround coherence values for the TF block (subframe) n.

The merging may take the form of taking the maximum of either the first or second measures to give a single measure ξ for the significance of the surround coherence values for the TF block (subframe) n.

$$\xi(n)=\max(\xi_1(n),\xi_2(n))$$

The output of the coherence values significance determiner 401 may be the single measure $\xi$ for the significance of the surround coherence values. This parameter may be passed to the coherence values encoding determiner 403. The processing block 403 can be arranged to determine whether the coherence values for the subframe should either be encoded or not encoded.

The processing step of merging the first and second measures to give a single measure indicating the significance of the surround coherence values for the TF block n is shown by 509 in FIG. 5.

In some embodiments the single measure $\xi$ for the significance of the surround coherence values may comprise solely the first measure, $\xi_1$, for the significance of the surround values. Alternatively, in other embodiments the single measure for the significance of the surround coherence values may comprise solely the second measure, $\xi_2$, for the significance of the surround values. In other words, in both of these embodiments there is no merging step 509. Therefore, the measure $\xi$ for the significance of the surround coherence values may either be just the first measure $\xi_1$ or just the second measure $\xi_2$ for the operation of the coherence values significance determiner 401.

Figure 6:
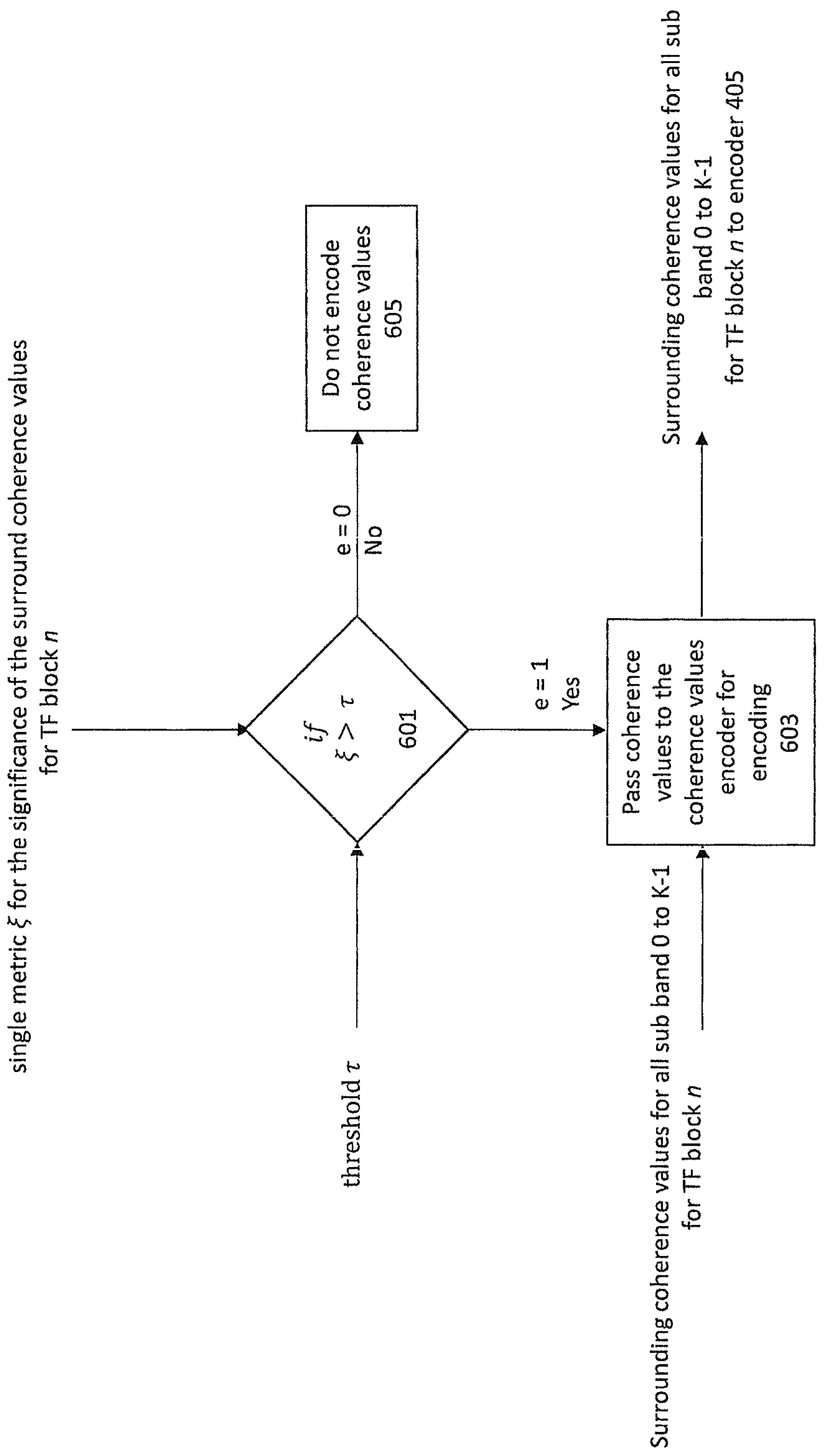
FIG. 6 shows a flow diagram of the operation of the coherence values encoding determiner shown in FIG. 4 the first according to some embodiments.

FIG. 6 shows an example set of processing steps which may be performed by the coherence values encoding determiner 403.

In embodiments the determination of whether the surround coherence values for the TF block should be encoded may take the form of comparing the single measure $\xi$ for the significance of the surround coherence values against a threshold value for the subframe n, $\tau(n)$. This comparison can be expressed as $$e(n)=1, \text{ if } \xi(n)>\tau(n)$$

$$e(n)=0, \text{ if } \xi(n)\leq\xi(n)$$

where e(n)=1 denotes encoding (and transmitting) the coherence values for TF block (or sub frame) n, and e(n)=0 denotes not encoding the coherence values for sub frame n.

The threshold value may be a constant. For example, may take a value such as $\tau(n)=\tau=0.15$. Alternatively, in some embodiments the threshold may change over time. For instance, the threshold value may be selected based on a factor based on a coding bit rate.

The step of comparing the single measure $\xi$ for the significance of the surround coherence value against a threshold value is shown as the processing step 601 in FIG. 6.

The functional block 403 may then be arranged to output the coherence values for the TF block (subframe) n, to the coherence parameter encoder 405, conditional upon the result of the above comparison indicating that the coherence values are significant enough to warrant encoding. Accordingly, FIG. 4 depicts a connection path from the coherence parameters encoding determiner 403 to the coherence parameter encoder 405. However, if the single measure $\xi$ for the significance of the surround coherence values does not exceed the threshold then the coherence values are not encoded.

The processing step of 603 in FIG. 6 depicts the situation when the single measure $\xi$ for the significance of the surround coherence values exceeds the threshold resulting in the coherence values for the block are sent to the coherence values encoder 405 for encoding. Conversely, the processing step of 605 in FIG. 6 depicts the situation when the single measure $\xi$ for the significance of the surround coherence values does not exceed the threshold resulting in the coherence values of the TF block not being encoded.

The coherence parameter encoder 405 is configured to receive the coherence values which have been determined as being perceptually significant from functional block 403. These coherence values may be a 8 bit representation between 0 and 1.

The coherence values encoder 405 may be configured to encode the coherence values associated with the sub bands for a TF block (or subframe) on a TF block by TF block basis. The coherence values encoder 405 may adopt an approach in which the coherence value for each sub band is first scalar quantized using a particular quantization table from a plurality of quantization tables. The selection of the particular quantization table for quantizing the coherence value may be dependent on the energy ratio value for each sub band, and the number of entries of each quantization table may differ from each other. In essence, each quantization table of the plurality of quantization tables may comprise a range of pre-computed quantized coherence values which may be tailored to particular energy ratio value.

The quantization table index associated with each coherence value may then be encoded using, either a product type code whereby all the quantization indices for the sub bands of the TF block are concatenated together into a combined index or a Run length code such as a Golomb Rice code.

In the case of using a Golomb Rice code to encode the quantization indices for the coherence values may have their mean value for the TF block removed.

Selecting between the joint combined index and Golomb Rice code for the encoding of the sub band coherence value quantization indices for the TF block can be made based on estimating the number of bits the Golomb Rice encoder will use. If this is less than the bits of the joint combined index, then the Golomb Rice encoder is used to encode sub band coherence value quantization indices for the TF block. The selection between the joint combined index method and the Golomb Rice method can be signaled as a single bit within the bitstream.

The index values to the codebooks may then form the encoded coherence values which are then combined with the encoded directional values and encoded energy ratios in the combiner 211 to form the spatial audio metadata.

Figure 7:
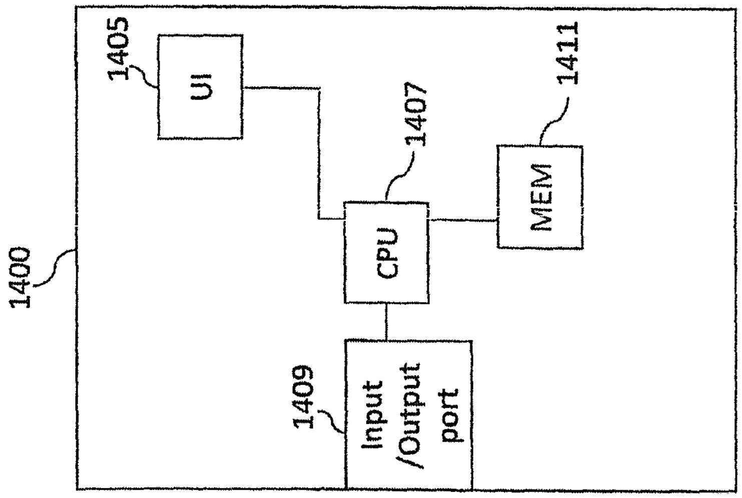
FIG. 7 shows schematically an example device suitable for implementing the apparatus shown.

With respect to FIG. 7 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus of an audio encoder, the apparatus comprising at least one processor and at least one memory including computer program code, the at least one memory and the computer program code configured to, with the at least one processor, cause the apparatus to:

receive or determine for one or more audio signals, spatial audio parameters on a sub band basis for providing spatial audio reproduction, wherein the spatial audio parameters comprise a surround coherence value for each sub band of a plurality of sub-bands of a frame;

receive an energy ratio value for each of the plurality of sub bands;

determine a significance measure for the surround coherence values of the plurality of sub bands of the frame by being caused to (i) determine a proportion of coherent non-directional energy for each of the plurality of sub bands, wherein the proportion of coherent non-directional energy for a sub band is determined as a non-directional energy ratio for the sub band multiplied by the surround coherence value for the sub band, wherein the non-directional energy ratio is related to a ratio of energy in the sub band remaining after the energy ratio value for the sub band has been removed, and (ii) sum, for all the plurality of sub bands, the determined proportion of coherent non-directional energy;

determine whether to encode the surround coherence values of the plurality of sub bands of the frame based on a comparison of the significance measure to a threshold value associated with the frame; and encode the surround coherence values of the plurality of sub bands of the frame that were determined to be encoded.

2. The apparatus as claimed in claim 1, wherein the apparatus caused to determine the significance measure for the surround coherence values of the plurality of sub bands of the frame is further caused to:

multiply, for each sub band, the proportion of coherent non-directional energy by the non-directional energy ratio;

sum, for all the plurality of sub bands, the multiple of the proportion of coherent non-directional energy and the non-directional energy ratio for each sub band; and normalize the summed multiple of the proportion of coherent non-directional energy and the non-directional energy ratio for each sub band by a summation of the non-directional energy ratio for each sub band.

3. The apparatus as claimed in claim 2, wherein the significance measure for the surround coherence values of the plurality of sub bands of the frame is a second significance measure for the surround coherence values of the plurality of sub bands of the frame.

4. The apparatus as claimed in claim 3, wherein the apparatus caused to determine the significance measure for the surround coherence values of the plurality of sub bands of the frame is caused to:

determine the significance measure for the surround coherence values of the plurality of sub bands of the frame as the maximum of a first significance measure and the second significance measure for the coherence values of the plurality of sub bands of the frame.

5. The apparatus as claimed in claim 1, wherein the significance measure for the surround coherence values of the plurality of sub bands of the frame is a first significance measure for the surround coherence values of the plurality of sub bands of the frame.

6. The apparatus as claimed in claim 1, wherein the surround coherence value is determined based on an inter-channel coherence between the two or more channel audio signals.

7. The apparatus as claimed in claim 6, wherein the surround coherence value for each of the plurality of sub bands is determined by the apparatus being caused to:

compute a covariance matrix associated with the two or more channel audio signals;

monitor a channel audio signal with a largest energy determined based on the covariance matrix and a sub-set of other channel audio signals, wherein the sub-set is a determined number between 1 and one less than a total number of channel audio signals with the next largest energies; and generate the surround coherence value based on selecting the minimum of normalized coherences determined between the channel audio signal with the largest energy and each of the next largest energy channel audio signals.

8. The apparatus as claimed in claim 1, wherein the energy ratio value for each of the sub bands is a direct-to-total energy ratio value for each of the sub bands.

9. The apparatus as claimed in claim 8, wherein the non-directional energy ratio for a sub band is determined as one minus the direct-to-total energy ratio for the sub band.

10. The apparatus as claimed in claim 1, wherein the encoded coherence values are generated using a quantization table selected from a plurality of quantization tables based on an energy ratio value associated with respective ones of the plurality of sub bands.

11. The apparatus as claimed in claim 10, wherein respective ones of the plurality of quantization tables comprise a different number of entries.

12. A method implemented by an audio encoder for spatial audio encoding comprising:

receiving or determining for one or more audio signals, spatial audio parameters on a sub band basis for providing spatial audio reproduction, wherein the spatial audio parameters comprise a surround coherence value for each sub band of a plurality of sub-bands of a frame;

receive an energy ratio value for each of the plurality of sub bands;

determining a significance measure for the surround coherence values of the plurality of sub bands of the frame by (i) determining a proportion of coherent non-directional energy for each of the plurality of sub bands, wherein the proportion of coherent non-directional energy for a sub band is determined as a non-directional energy ratio for the sub band multiplied by the surround coherence value for the sub band, wherein the non-directional energy ratio is related to a ratio of energy in the sub band remaining after the energy ratio value for the sub band has been removed, and (ii) summing, for all the plurality of sub bands, the determined proportion of coherent non-directional energy;

determining whether to encode the coherence values of the plurality of sub bands of the frame based on a comparison of the significance measure to a threshold value associated with the frame; and encoding the surround coherence values of the plurality of sub bands of the frame that were determined to be encoded.

13. The method as claimed in claim 12, wherein determining the significance measure for the surround coherence values of the plurality of sub bands of the frame further comprises:

multiplying, for each sub band, the proportion of coherent non-directional energy by the non-directional energy ratio;

summing, for all the plurality of sub bands, the multiple of the proportion of coherent non-directional energy and the non-directional energy ratio for each sub band; and normalizing the summed multiple of the proportion of coherent non-directional energy and the non-directional energy ratio for each sub band by a summation of the non-directional energy ratio for each sub band.

14. The method as claimed in claim 13, wherein the significance measure for the surround coherence values of the plurality of sub bands of the frame is a second significance measure for the surround coherence values of the plurality of sub bands of the frame.

15. The method as claimed in claim 14, wherein determining the significance measure for the surround coherence values of the plurality of sub bands of the frame comprises:

determining the significance measure for the surround coherence values of the plurality of sub bands of the frame as the maximum of a first significance measure and the second significance measure for the coherence values of the plurality of sub bands of the frame.

16. The method as claimed in claim 12, wherein the significance measure for the surround coherence values of the plurality of sub bands of the frame is a first significance measure for the surround coherence values of the plurality of sub bands of the frame.

17. The method as claimed in claim 12, wherein the surround coherence value is determined based on an interchannel coherence between the two or more channel audio signals.

18. A computer program product embodied on a non-transitory computer readable medium, comprising computer program code configured to, when executed on at least one processor, cause an apparatus of an audio encoder to:

receive or determine for one or more audio signals, spatial audio parameters on a sub band basis for providing spatial audio reproduction, wherein the spatial audio parameters comprise a surround coherence value for each sub band of a plurality of sub-bands of a frame;

receive an energy ratio value for each of the plurality of sub bands;

determine a significance measure for the surround coherence values of the plurality of sub bands of the frame by (i) determining a proportion of coherent non-directional energy for each of the plurality of sub bands, wherein the proportion of coherent non-directional energy for a sub band is determined as a non-directional energy ratio for the sub band multiplied by the surround coherence value for the sub band, wherein the non-directional energy ratio is related to a ratio of energy in the sub band remaining after the energy ratio value for the sub band has been removed, and (ii) summing, for all the plurality of sub bands, the determined proportion of coherent non-directional energy;

determine whether to encode the surround coherence values of the plurality of sub bands of the frame based on a comparison of the significance measure to a threshold value associated with the frame; and encode the surround coherence values of the plurality of sub bands of the frame that were determined to be encoded.

* * * * *